United States Patent [19]

Nara et al.

[11] Patent Number: 4,593,670
[45] Date of Patent: Jun. 10, 1986

[54] FUEL EVAPORATOR FOR INTERNAL COMBUSTION ENGINE

[75] Inventors: Akio Nara, Okazaki; Akio Yazawa, Ōbu; Yoshinori Akiyama, Okazaki, all of Japan

[73] Assignee: Nippondenso Co., Ltd., Kariya, Japan

[21] Appl. No.: 671,614

[22] Filed: Nov. 15, 1984

[30] Foreign Application Priority Data

Nov. 20, 1983 [JP] Japan .......................... 58-179040[U]

[51] Int. Cl.$^4$ ............................................... F02M 31/00
[52] U.S. Cl. ..................................... 123/545; 123/546; 123/549; 261/142; 219/206
[58] Field of Search ............... 123/545, 546, 549, 552; 219/205, 206, 207; 261/142

[56] References Cited

U.S. PATENT DOCUMENTS 4,361,125 11/1982 Igashira et al. .
4,377,148  3/1983 Ishida .................................. 123/545
4,390,000  6/1983 Igashira et al. .
4,463,737  8/1984 Berg .................................... 123/547

FOREIGN PATENT DOCUMENTS 65849 4/1982 Japan .................................. 123/549
97060 6/1982 Japan .................................. 123/549

Primary Examiner—Ronald H. Lazarus
Attorney, Agent, or Firm—Cushman, Darby & Cushman

[57] ABSTRACT

A fuel evaporator comprises a ring-shaped heater element made of PTC ceramic, a pipe made of heat conductive metal and disposed within an air-fuel passage of an internal combustion engine therealong and a pair of terminal members for supplying power to the heater element. The heater element is disposed closely in contact with the outer periphery of the upper end of the pipe. One end of each of the pair of terminal members is closely in contact with each of the upper and under surfaces of the heater element. The fuel evaporator further comprises a plate-shaped compact made of electricity insulating rubber or synthetic resin and formed around the upper end of the pipe. Within the compact, the heater element, the upper end of the pipe and the terminal members are embedded.

5 Claims, 11 Drawing Figures

F I G.6
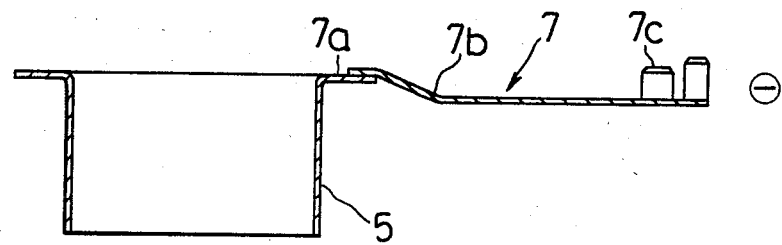
F I G.7
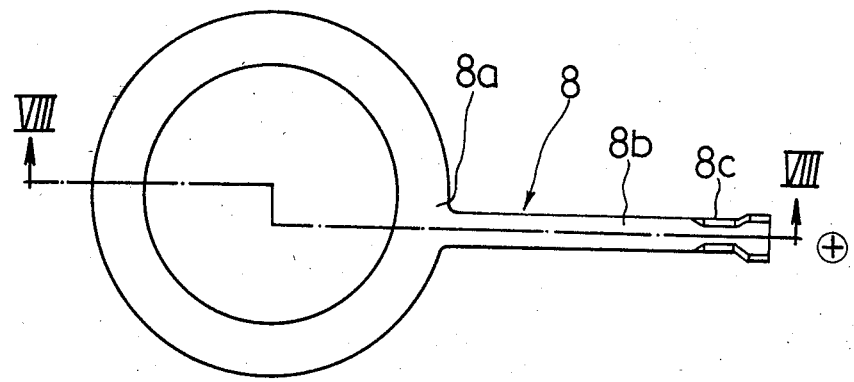
F I G.8
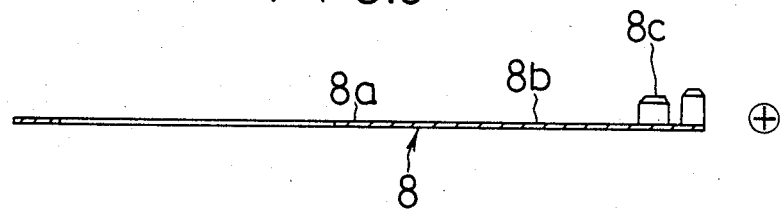

FUEL EVAPORATOR FOR INTERNAL COMBUSTION ENGINE

BACKGROUND OF THE INVENTION

The present invention relates to a fuel evaporator for heating an air-fuel mixture to promote the evaporation of fuel therein in an internal combustion engine.

Conventionally, the fuel evaporator of this type is provided with a heater element made of ceramic having a positive temperature coefficient of resistance (PTC ceramic) such as barium titanate.

The PTC ceramic does not overheat due to the self electric current control function thereof so as to be effective as a heater element of the fuel evaporator.

However, many members such as a heater element, a casing for retaining the heater element, a power supply member for supply power to the heater element, and an insulating member for fixing the casing to an air-fuel mixture passage, must be assembled in order to install the conventional fuel evaporator in the air-fuel mixture passage. And troublesome works are required for assembling them.

When the heater element which is fragile, is broken, pieces of broken element is in danger of being inspired into a combustion chamber of the engine together with an air-fuel mixture.

SUMMARY OF THE INVENTION

One object of the present invention is to provide a fuel evaporator provided with a heater element, which is simple in its structure and is easily installed in an air fuel mixture passage of an internal combustion engine.

Another object of the present invention is to provide a fuel evaporator which is free from the danger that pieces of broken element are inspired into the combustion chamber.

The fuel evaporator of the present invention comprises a ring-shaped heater element made of PTC ceramic, a pipe of which one end is in contact with the heater element, to which heat of the heater element is transferred, and through which the air-fuel mixture passes, a pair of terminal members through which power is supplied to the heater element and one end of which sandwiches the heater element, and a plate-shaped compact made of rubber of synthetic resin, which is molded around the outer periphery of the pipe and in which the heater element and the pair of terminal members are embedded.

The fuel evaporator of the present invention is secured to the wall of an air-fuel mixture passage of the engine by means of the above described compact.

BRIEF DESCRIPTION OF THE DRAWINGS

FIG. 6 is a sectional view taken along the line of VI—VI of FIG. 5;

FIG. 7 is a plan view of the other terminal member to which another power supply line is not secured;

FIG. 8 is a sectional view taken along the line VIII—VIII of FIG. 7;

DETAILED DESCRIPTION OF INVENTION

Hereinafter, the present invention will be explained in accordance with embodiments thereof with reference to the accompanying drawings.

Figure 1:
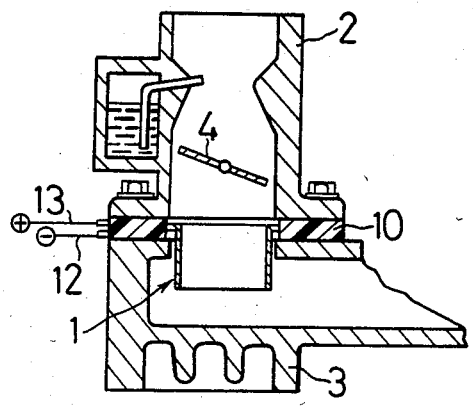
FIG. 1 is a sectional view of the carburetion system of an internal combustion engine, which is provided with a fuel evaporator of the present invention.

FIG. 1 is a sectional view illustrating the carburetion system of an internal combustion engine.

A fuel evaporator 1 is positioned directly under a throttle valve 4, sandwiched between a carburetor 2 and an intake manifold 3 and secured thereto by means of a compact 10 made of synthetic resin.

FIGS. 2 to 9 illustrate the detailed structure of the fuel evaporator of the present invention.

A heater element 6 is a sintered body made of PTC ceramic containing barium titanate as a main constituent and having a ring shape.

On each of an upper and an under surface of the heater element 6, a thin film shaped electrode (not shown) is formed. The heater element 6 is sandwiched by a pair of terminal members 7 and 8. The reference numeral 5 designates a pipe for passing an air-fuel mixture therethrough. The pipe 5 is provided with a flange projecting from the upper end thereof.

Figure 5:
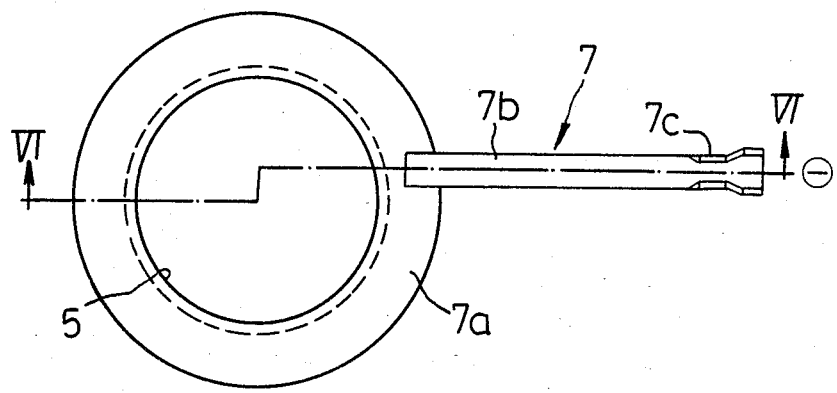
FIG. 5 is a plan view of one of pair of terminal members, to which a power supply line is not secured.

One terminal member 7 comprises a ring portion 7a which is composed of the flange of the pipe 5, a lead portion 7b of which one end is welded to the ring portion 7a and extending in the lateral direction, and a caulking portion 7c formed in the top end portion of the lead portion 7b as shown in FIGS. 5 and 6.

The other terminal member 8 comprises a ring portion 8a, a lead portion 8b extending from the ring portion 8a in the lateral direction so as to be nearly equal to the lead portion 7b, and a caulking portion 8c formed in the top end portion of the lead portion 8b as shown in FIGS. 7 and 8.

The heater element 6 is interposed between the ring portion 9a of the terminal member 7 and the ring portion 8a of the terminal member 8 through a cushion sheet 15 made of an electricity and heat conductive elastic body such as a graphite body, respectively as shown in FIG. 3. The pipe 5 and the terminal members 7 and 8 are made of an electricity and heat conductive metal such as copper, brass and iron.

The heater element 6 sandwiched by the terminal members 7 and 8 is accomodated within a casing 9.

Figure 9:
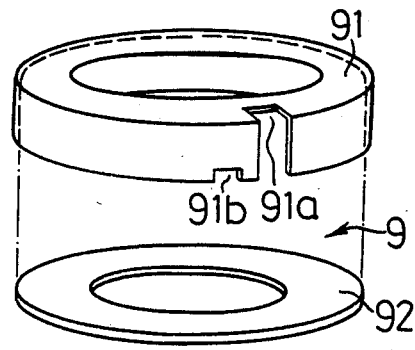
FIG. 9 is a perspective view of a casing.

As shown in FIG. 9, the casing 9 is made of heat insulating and electricity insulating synthetic resin and is composed of a lid member 91 and a bottom plate 92. An open hole is formed in each of the lid member 91 and the bottom plate 92 so as to correspond to a central hole of the heater element 6, namely the air-fuel mixture passage defined by the carbureter 2.

Notches 91a and 91b are formed in the side wall of the lid member 91. The terminal members 7 and 8 extend out of the casing 9 in the lateral direction from the notches 91a, 91b thereof.

Figure 2:
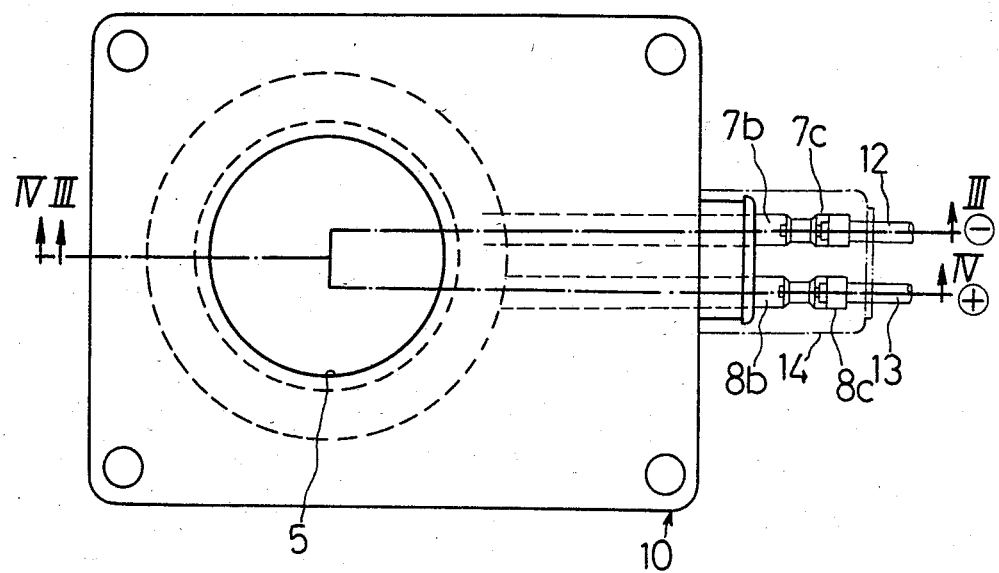
FIG. 2 is a plan view of the fuel evaporator of the present invention.
Figure 3A:
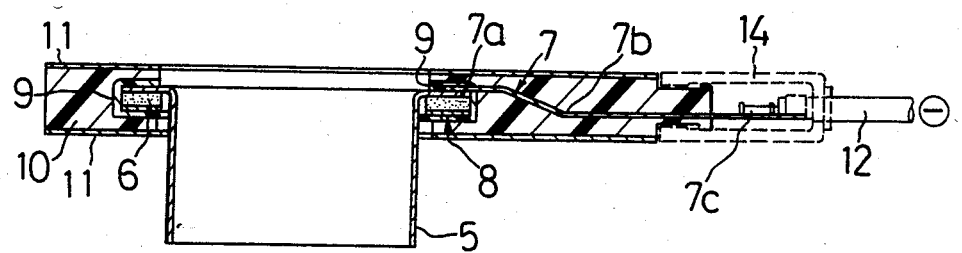
FIGS. 3A and 3B are sectional views taken along the line III—III of FIG. 2.
Figure 3B:
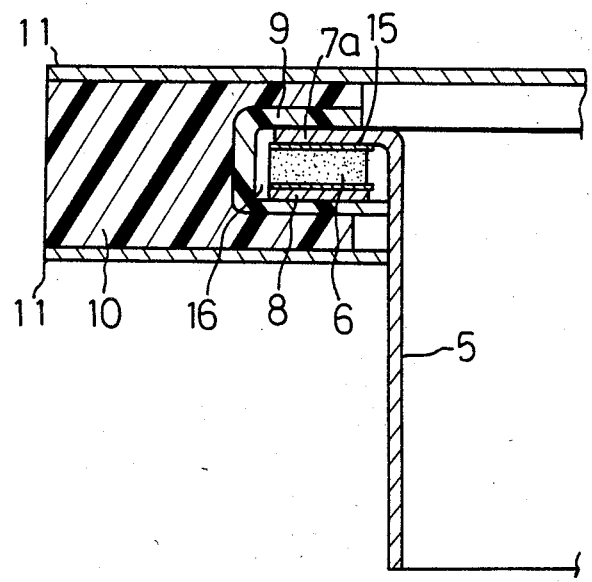
Figure 4:
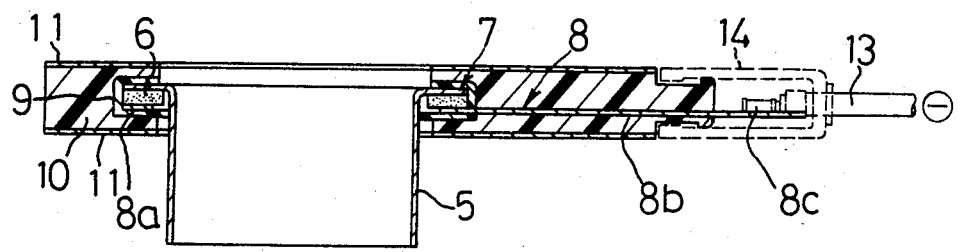
FIG. 4 is a sectional view taken along the line of IV—IV of FIG. 2.

And a compact 10 made of heat insulating and electricity insulating synthetic resin is moulded into a rectangular plate-shape around the outer periphery of the casing 9 so as to cover the terminal members 7 and 8 as shown in FIGS. 2 to 4. Rubber can be used in place of the above described synthetic resin.

The compact 10 is moulded by interposing the heater element 6 between the terminal members 7 and 8 through the cushion sheets 15 as shown in FIGS. 3 and 4, particularly FIG. 3A, setting the heater element 6 and the terminal members 7 and 8 while being pressed by the lid member 91 and the bottom plate 92 of the casing 9, within a mould and pouring the synthetic resin into the mould.

When the heater element 6 and the casing 9 are set, it is preferable to form a small gap 16 between the casing 9 and the heater element 6 as shown in FIG. 3B. The top end of each of the terminal members 7 and 8 projects out of the obtained compact 10.

The fuel evaporator having the above described structure can be easily installed in the air-fuel mixture passage directly under the throttle valve 4 by adhering gaskets 11 on the upper and under surfaces of the compact 10, disposing the compact 10 between the carbureter 2 and the intake manifold 3 as shown in FIG. 1 and connecting them to each other by means of bolts.

As shown in FIGS. 2 to 4, a power supply line 12 on the minus side is connected to the caulking portion 7c by caulking while another power supply line 13 on the plus side is connected to the caulking portion 8c by caulking. The caulked portion of each of the power supply lines 12 and 13 is protected by a heat resistant rubber cap 14.

In operation, when a power is applied between the power supply lines 12 and 13, an electric current flows therebetween so that the heater element 6 generates heat by itself. The generated heat is transferred from the ring portion 7a of the terminal member 7 to the pipe 5 to heat the air-fuel mixture passing through the pipe 5. Consequently, the fuel evaporation is promoted.

According to the present invention, the fuel evaporator has a simple structure since the casing, heater element fuel evaporating portion and terminal members are formed into one body by means of a plate shaped compact made of rubber or synthetic resin.

In addition, the fuel evaporator of the present invention can be easily installed in the air-fuel mixture passage of the internal combustion engine by virtue of the plate shaped compact.

Furthermore, if the heater element is broken, the broken pieces are retained within the casing so as not to fall into the air-fuel mixture passage.

Figure 10:
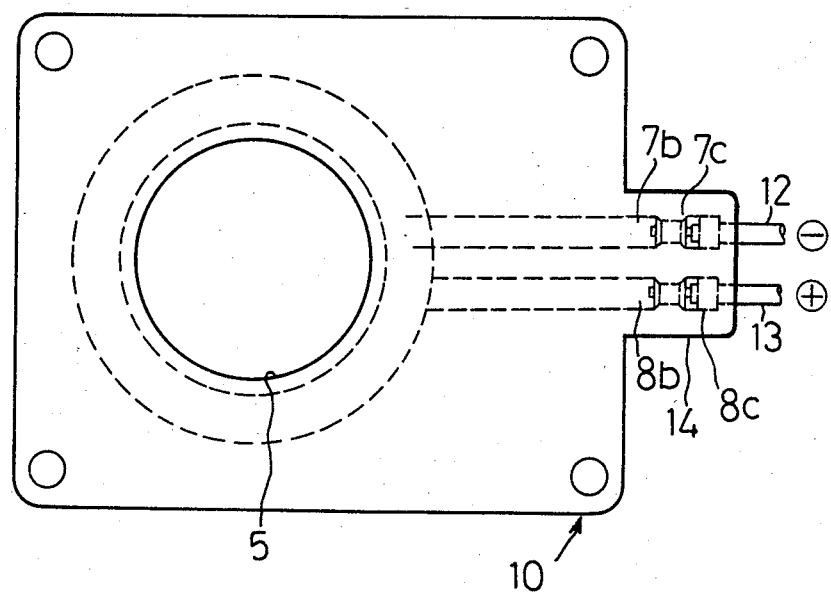
FIG. 10 is a view illustrating another embodiment of a fuel evaporator according to the present invention.

FIG. 10 illustrates another embodiment. According to this embodiment, the whole terminal members 7 and 8 including the caulked portion of each of the power supply lines 12 and 13 are embedded within the compact 10. In this case, the power supply lines 12, 13 are covered with a material having a high melting point such as Teflon.

The fuel evaporator 1 is subjected to vibrations of the engine. Due to such vibrations, a bending stress is applied to the top end of each of the terminal members 7 and 8 made of copper or the like and projecting out of the compact 10 so that the terminal member 7 and 8 are in danger of being deformed or broken.

According to the present embodiment, since the whole terminal members 7 and 8 are embedded within the compact, such deformation or breakage do not occur. And rust can be prevented from being produced in the caulking portion of the terminal members 7 and 8.

In the above described embodiments, the heater element 6 and the terminal members 8 and 9 are accomodated within a casing 9 and then synthetic resin is moulded around the casing 9.

Instead, the casing 9 can be omitted. In this case, synthetic resin is directly moulded around the heater element 6 and the terminal members 8 and 9. These members must be made more closely into contact so that synthetic resin does not penetrate into the gaps formed therebetween.

What is claimed is:

1. A fuel evaporator disposed in an air-fuel mixture passage of an internal combustion engine for promoting the evaporation of fuel within an air-fuel mixture, comprising:
   (1) a ring-shaped heater element made of PTC ceramic;
   (2) a pipe through which the air-fuel mixture passes; said pipe being made of heat conductive metal and being disposed within said air-fuel passage therealong; said pipe comprising a flange projecting outwardly from an upper end thereof;
   said heater element being disposed under and closely in contact with said flange of said pipe;
   (3) a pair of terminal members for supplying power to said heater element, which is composed of a first terminal member and a second terminal member, said first terminal member comprising a ring portion disposed above said heater element so as to be closely in contact therewith, and a lead portion of which one end is connected to said ring portion and the other end extends outwardly in the radial direction and is connected to a power supply line; said second terminal member comprising a ring portion disposed under said heater element so as to be closely in contact therewith, and a lead portion arranged along said lead portion of said first terminal member, one end of said lead portion of said second terminal member being connected to said ring portion thereof while the other end of said lead portion of said second terminal member being connected to another power supply line;
   said flange of said pipe comprising said ring portion of said first terminal member;
   (4) an electricity insulating casing for accommodating and closely sandwiching said flange of said pipe, said heater element and said ring portion of said second terminal member, said casing being composed of a ring-shaped bottom plate having an inner hole and a lid member having an opening of a shape corresponding to said inner hole of said bottom plate; and
   (5) a compact made of electrically insulating rubber or synthetic resin and formed into a plate shape around said casing by moulding so that said casing is embedded within said compact.

2. A fuel evaporator disposed in an air-fuel mixture passage of an internal combustion engine for promoting the evaporation of fuel within an air-fuel mixture, comprising:
   (1) a ring-shaped heater element made of PTC ceramic;
   (2) a pipe made of heat conductive metal, which is disposed along the air-fuel mixture passage and has a cylindrical portion through which the air-fuel mixture passes and a flange portion extending in a direction of an outer periphery of said cylindrical portion from an end portion of said cylindrical portion;

said ring-shaped heater element being closely adhered to said flange portion;

(3) a pair of terminal members for supplying power to said heater element, which is composed of a first terminal member and a second terminal member, said first terminal member being in contact with an upper surface of said heater element and being connected to a power supply line and said second terminal member being in contact with an under surface of said heater element and being connected to another power supply line;

(4) a casing made of an electrically insulating material for accommodating said heater element, said flange portion of said pipe, an end portion of said first terminal member and an end portion of said second terminal member so as to be closely adhered to one another, said casing being composed of a ring-shaped bottom plate having an inner hole corresponding to the air-fuel mixture passage and a lid member having an opening of a shape corresponding to said inner hole; and (5) a compact made of electrically insulating rubber or synthetic resin and formed into a plate shape around said casing by moulding so that said casing is embedded within said cmpact.

3. A fuel evaporator according to claim 1, wherein said the other end of said first terminal member and said the other end of said second terminal member project out of said compact outwardly.

4. A fuel evaporator according to claim 1, wherein said the other end of each of said first and second terminal members and one end of each of said power supply lines, which is connected to each of said first and second terminal members are embedded within said compact.

5. A fuel evaporator according to claim 1, wherein the outer periphery of said compact is interposed between an end of a carburetor and an end of an intake manifold which are opposed and connected to each other; whereby said fuel evaporator is retained within said air-fuel mixture passage.

* * * * *